(12) United States Patent
Lata Perez

(10) Patent No.: US 6,935,834 B2
(45) Date of Patent: Aug. 30, 2005

(54) NOISE REDUCTION CONDUIT FOR STATIC COMPONENTS IN AIRCRAFT ENGINES

(75) Inventor: Jesús María Lata Perez, Bilbao (ES)

(73) Assignee: Sener, Ingenieria y Sistemas, S.A. (ES)

( * ) Notice: Subject to any disclaimer, the term of this patent is extended or adjusted under 35 U.S.C. 154(b) by 0 days.

(21) Appl. No.: 10/642,836

(22) Filed: Aug. 14, 2003

(65) Prior Publication Data

US 2004/0076512 A1 Apr. 22, 2004

(30) Foreign Application Priority Data

Aug. 14, 2002 (ES) .......................................... 200201928

(51) Int. Cl.⁷ .............................................. F01D 25/24
(52) U.S. Cl. ................................................... 415/115
(58) Field of Search .......................... 415/119; 181/284, 181/292, 293

(56) References Cited

U.S. PATENT DOCUMENTS

| | | | | |
|---|---|---|---|---|
| 2,988,302 A | * | 6/1961 | Smith .......................... 244/15 |
| 3,542,152 A | * | 11/1970 | Oxx, Jr. et al. .............. 181/214 |
| 4,828,175 A | * | 5/1989 | Heufler et al. ............... 239/142 |
| 5,592,813 A | * | 1/1997 | Webb ........................ 60/226.2 |

* cited by examiner

Primary Examiner—Ninh H. Nguyen
(74) Attorney, Agent, or Firm—Ostrolenk, Faber, Gerb & Soffen, LLP

(57) ABSTRACT

Noise reduction conduit for non rotary components of aircraft engines, subjected to a characteristic range of temperatures of a gas turbine engine, constituted by an annular structure composed of an aerodynamic wet wall (10a, 10b), perforated and resistant mechanically and thermally; of a dry wall (12a, 12b), not resistant and of light weight; and of some intermediate elements to which both walls are mechanically attached and that define a jump or difference of temperature between the wet and dry walls; between which wet (10a, 10b) and dry walls (12a, 12b) there are partitions that define cavities (16a, 16b) isolated with regard to each other.

17 Claims, 4 Drawing Sheets

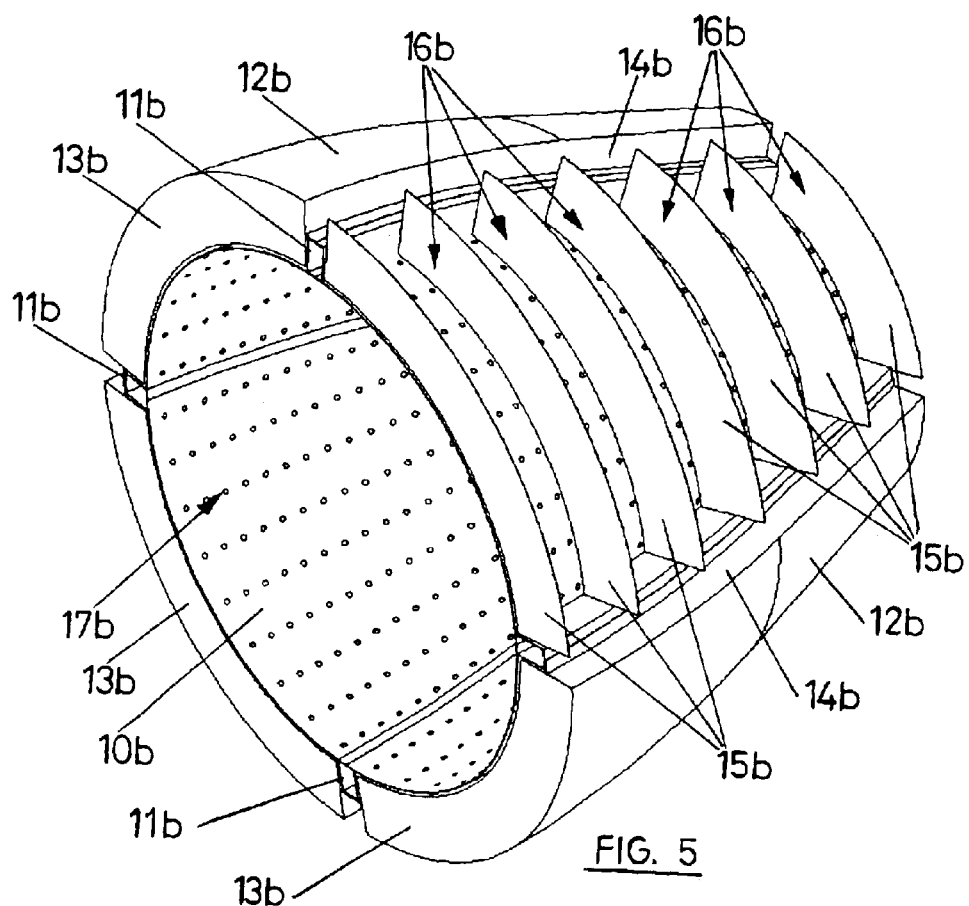
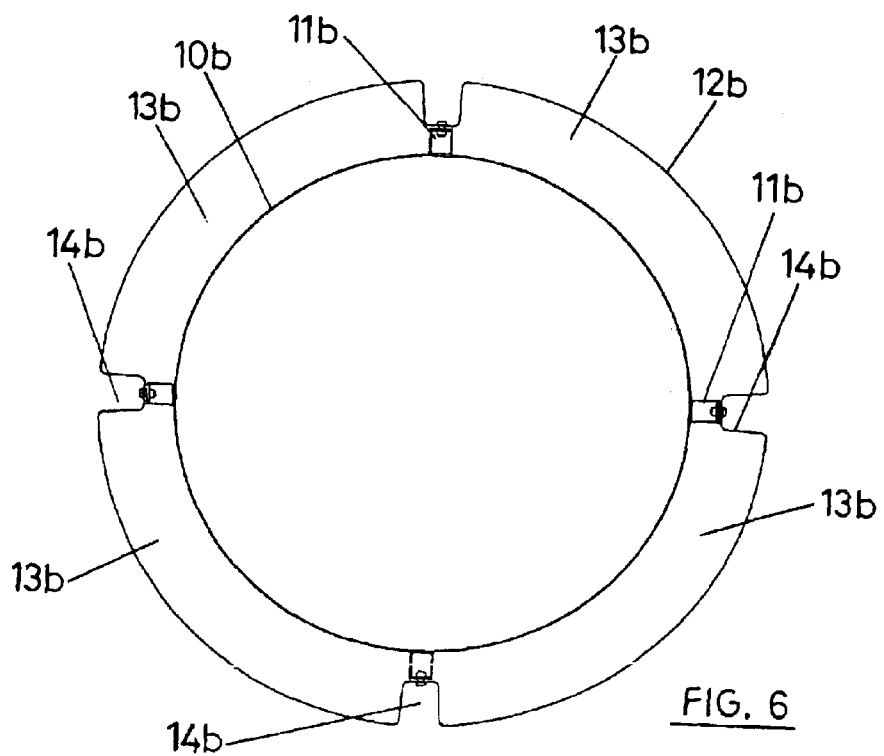

NOISE REDUCTION CONDUIT FOR STATIC COMPONENTS IN AIRCRAFT ENGINES

TECHNICAL FIELD

The present invention relates to gas turbine engines, and more particularly to a noise reduction structure, disposed adjacent to an annular gas flow passing through such an engine.

STATE THE OF ART

Nowadays, the noise around airports causes world concern, especially in some local communities, which are subjected to high noise levels coming from airplanes.

The need for reduction of noise, coming from the engines as well as noise generated by the high-speed airflow, is especially important, both in what regards limitation of the noise by takeoff and airports, and in what regards guaranteeing the comfort of the passenger, protecting them from the noise generated by the airplane or by the engines.

The noise generated by a commercial airplane powered by one or several gas turbines is classified in airframe or engine noise, differing in this latter category according to the source that originate it in: fan noise, combustion chamber noise, turbine noise, low-pressure compressor noise and noise produced by the hot exhaust gases.

The engine take-off noise is, usually, the most significant noise source because the engine works at its maximum power.

On the other hand, aircraft manufacturers are subjected to an increasing pressure to produce rigid, light and durable structures that require low cost, so much of manufacturing as of maintenance along useful life of the structure.

Due to all factors mentioned before, there is an increasing interest in the aircraft manufacturing industry to develop noise absorbers, having in consideration their efficiency, weight and durability, as well as their complexity.

These structures for noise reduction should minimise their influence in the engine efficiency.

In this sense U.S. Pat. No. 4,452,335 could be cited, that describes a noise reduction structure which has a compartmentalized cavity in several partitions in axial and circumferential directions.

In the document of reference NASA/CR-1999-209002 titled "Advanced Turbofan Duct Conduit Concepts" a brief description can be found of the most utilised concepts to get a noise reduction in gas turbine engines.

SUMMARY OF THE INVENTION

The invention described next consists in a noise reduction conduit for static (non rotary) aircraft components belonging to the engine structure or to the structures surrounding the engine, subjected to a characteristic range of temperature of a gas turbine engine.

The design is based on a, preferably, hybrid structure that allows for complying with objectives of low weight, assembly/disassembly capability, capacity of inspection and durability, existing in the aeronautical industry.

The structure that makes up the conduit of the present invention, is called hybrid because of offering that the wet and dry walls can be manufactured of different materials.

It is an annular structure, constituted by a wall bathed by the fluid that passes through the engine, called wet, and a wall not bathed by said fluid, called dry. There are fundamentally two configurations for the present invention: annular structure external to the fluid, in which case the wet wall is the inner one and the dry wall is the outer one; or annular structure internal to the fluid where the wet wall is the outer one and the dry wall is the inner one.

The structure object of this invention is characterised by having uncoupled and optimised thermo/structural behaviour.

The aerodynamically wet wall will be characterised by having an adequate profile, in order to fulfil the aerodynamics requirements imposed by the engine, and perforations with the adequate density and size of holes according to the specific acoustic requirements for each application. This wall will be thermally and mechanically resistant. The wall could be reinforced with stiffeners according to structural requirements that the component should withstand.

The dry wall is defined, exclusively, for acoustic purposes, so it is not intended to transmit structural loads from the wet wall to the dry one. This wall will be materialized as a laminar wall, circumferentially discontinuous, or by means of independent circular sectors, in order to eliminate the thermal stresses that the radial temperature gradient would cause between the wet wall, hotter, and the dry one, colder, in the case that both were circumferentially continuous. This materialization, in circumferential sectors, allows also an easier manufacturing.

Nevertheless, this configuration that minimises the global thermal stresses could cause local thermal stresses on the joining corners of the independent sectors with the continuous wet wall. In order to minimise these local thermal stresses it is possible to use continuous stiffeners in circumferential direction, which would be joined to the wet wall and located close to the edges that limit the sectors in axial direction.

This laminar wall, not continuous circumferentially, or circular sectors that constitute the dry wall, are limited on their transversal edges by means of a series of sheets or partitions, forming one or several longitudinal sectors. These sectors are in turn divided by several sheets with non-continuous disc shape disposed in such manner that, jointly with the dry wall, the wet wall and the longitudinal partitions, form a series of closed cavities.

By this way, the resulting structure could be materialized with one or several circumferential cavities and one or several cavities in axial direction.

The depth and length of these cavities arranged in axial direction can be variable along the noise reduction conduit and will be fixed according to the acoustic requirements of the conduit.

The compromise between small cavities that guarantee better acoustic performance and big cavities that minimise the weight and complexity of the component is compatible with the design concept herein proposed.

The connection between the wet and dry walls that compose the noise reduction conduit will, preferably, be so that it can be taken apart or non-permanent so that the assembly/disassembly capacity of the structure is allowed; although, a structure characterised by a connection between the wet and dry walls through a non-removable or permanent mechanical connection is considered too within the scope of the present invention, whenever the thermal/structural behaviour between both walls is guaranteed to be uncoupled. The connection between wet and dry walls could be carried out directly or through possible intermediate elements, such as resistant elements or stiffeners joined to the wet wall, and with the main mission of helping to withstand the thermal and structural stresses on the structure.

The aerodynamically wet wall could be manufactured with the more heat-resistant material that usually has the higher density, which will act as thermal barrier. The dry wall could be manufactured in a lighter material and usually with lower resistance to temperature.

The following couples are cited as typical metallic materials, but the present invention allows the application of any other couples:

1. Nickel alloys (Inconel 718, Waspaloy, René 41 . . . ) for the wet wall and Titanium alloys for the dry wall, in the case of exposure to high temperatures (600–750° C.).
2. Titanium alloys for the wet wall and Aluminium alloys for the dry wall, in the case of exposure to medium temperatures (250–350° C.).

The main advantage offered by the possibility to select different materials for the wet and dry walls, is the weight saving which can result from adapting each material to the requirements of each wall.

Even using the same material for both wet and dry walls, another advantage offered by the present invention, in which the behaviour of both walls is uncoupled, is the possibility of disassembly of the structure (in case the procedure of connection allows it) in order to carry out inspection functions, maintenance, etc. and also making the manufacturing process of the structure easier.

The structure described above acts as an acoustic resonator by itself when the described cavities are empty (air-filled), it being possible to complement or improve its acoustic reduction behaviour by introducing in said cavities a honeycomb layer, double honeycomb layer, perforated sheet or any porous material with sound damping characteristics, such as metallic foam, etc. and/or combinations of these materials.

In this sense, the advantages may be emphasized that the present invention offers in the case that a honeycomb layer of an appropriate material is joined (by brazing, bonding, etc.) to the wet and dry walls simultaneously, acting as intermediate connection element between them, with the possibility that both walls be made of different materials, as the mechanical characteristics of the honeycomb structure allow absorption of the difference in expansion between the wet wall, hotter, and the dry one. In this case, the connection between both walls could be directly through the honeycomb structure.

This particular case also offers the advantage of obtaining the lightest structural solution since the honeycomb structure supports the wet and dry walls in their perpendicular direction avoiding buckling failures generated by the component loads in service, then allowing to reduce the thickness of those walls with the consequent weight saving.

Another advantage of the honeycomb structure is that it already forms, jointly with both wet and dry walls, closed cavities by themselves and in consequence additional partitions of closing are not needed for the edges of the honeycomb structure.

All the exposed characteristics, as well as other characteristics of the invention, such as they are defined in the claims, will become more apparent by the following description, made with reference to the attached drawings in which a possible embodiment is shown, given as non limitative example.

DESCRIPTION OF THE DRAWINGS

FIG. 5 is a perspective view, partially cut, of a noise reduction conduit according to the present invention, in which the aerodynamically wet wall is the inner wall of the conduit.

FIG. 6 is a cross-section perpendicular to the engine axis, of the noise reduction conduit according to the second materialization proposed.

DESCRIPTION OF THE PREFERRED EMBODIMENT

Figure 1:
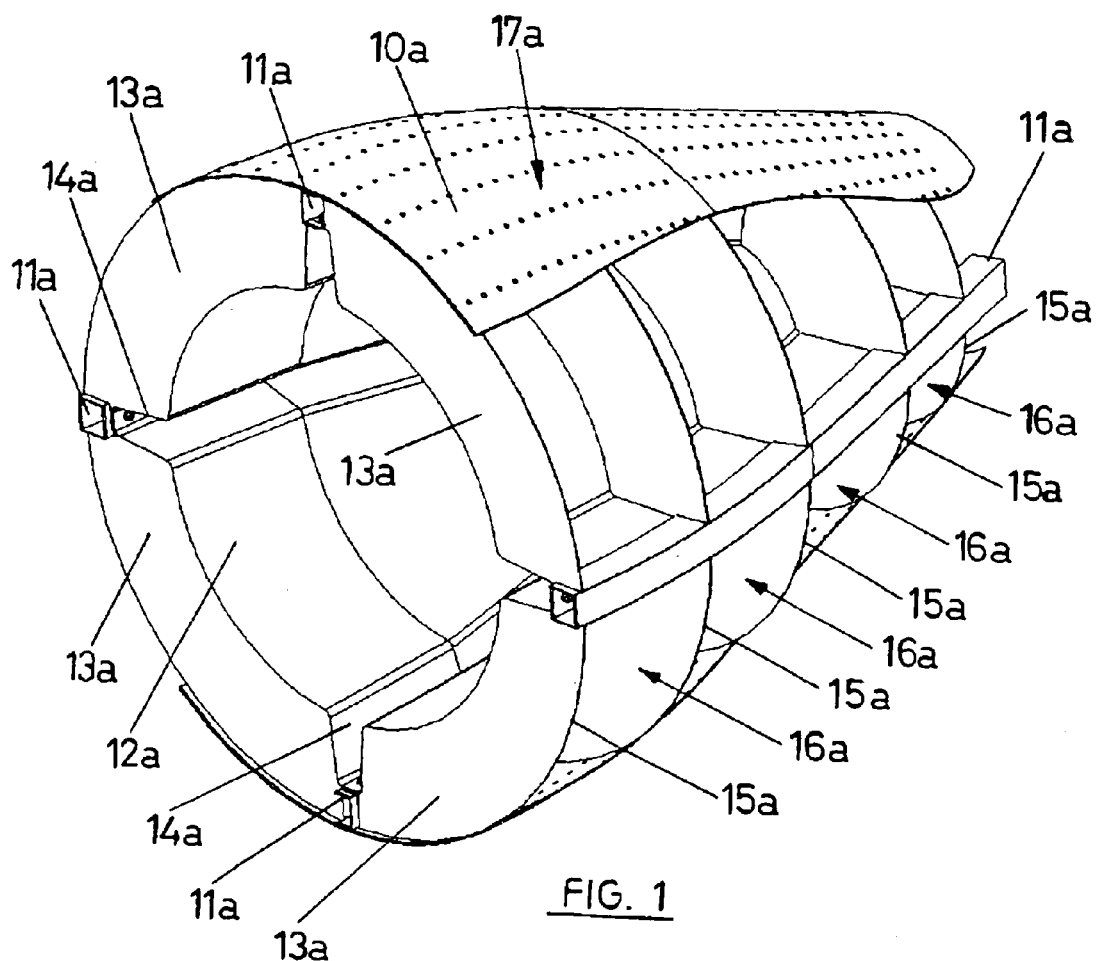
FIG. 1 is a perspective view, partially cut, of a noise reduction conduit constituted according to the invention.

FIG. 1 shows a perspective view of an annular cone structure usually located in the exhaust area of a gas turbine engine. For improved clarity the flange where the structure is attached to the rest of the engine has been omitted, as well as the end part of the cone that has no interest from the noise reduction point of view.

The noise reduction conduit includes an outer wall, or aerodynamically wet wall, $10a$ that follows an aerodynamic profile defined by the aerodynamic requirements imposed by the engine.

This outer wall is perforated with a density and size of holes $17a$ defined according to the acoustic requirements of the specific application.

The outer wall is completed with a series of intermediate resistant elements or stiffeners $11a$ that are disposed in the axial direction.

The outer wall $10a$ will be secured to the stiffeners $11a$ through a mechanical joint using screws and nuts or rivets. Other joining methods can be used too, as welding, brazing or bonding in case the gas temperature that passes through the engine allows it.

In the materialization presented in the FIG. 1, the number of stiffeners $11a$ is 4, allowing the installation of the outer wall $10a$ in 2 or 4 equal parts.

Figure 2:
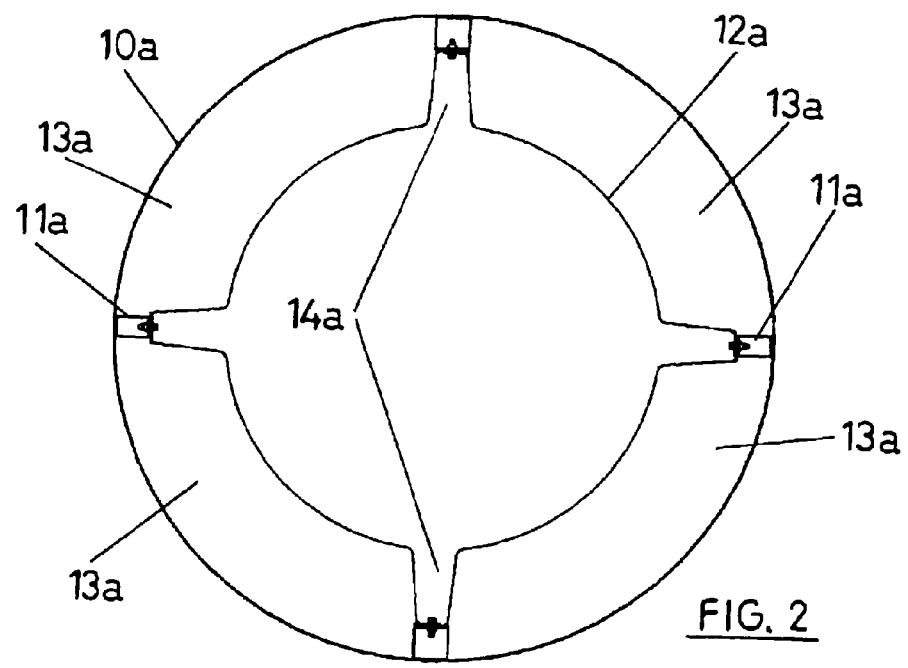
FIG. 2 is a cross-section perpendicular to the engine axis, of the noise reduction conduit.

As the inner skin, or dry wall, $12a$ is divided in four identical parts, the space located between it and the outer wall $10a$ is circumferentially composed by four sectors $13a$ that are identical and independent between them, limited longitudinally by partitions $14a$ connected to the outer wall through the stiffeners $11a$ by means of mechanical joints. FIG. 2 shows the joint by screw and nut between the inner wall $12a$ and the stiffeners $11a$. Other joining methods will be valid too to materialize the cited joint.

Figure 3:
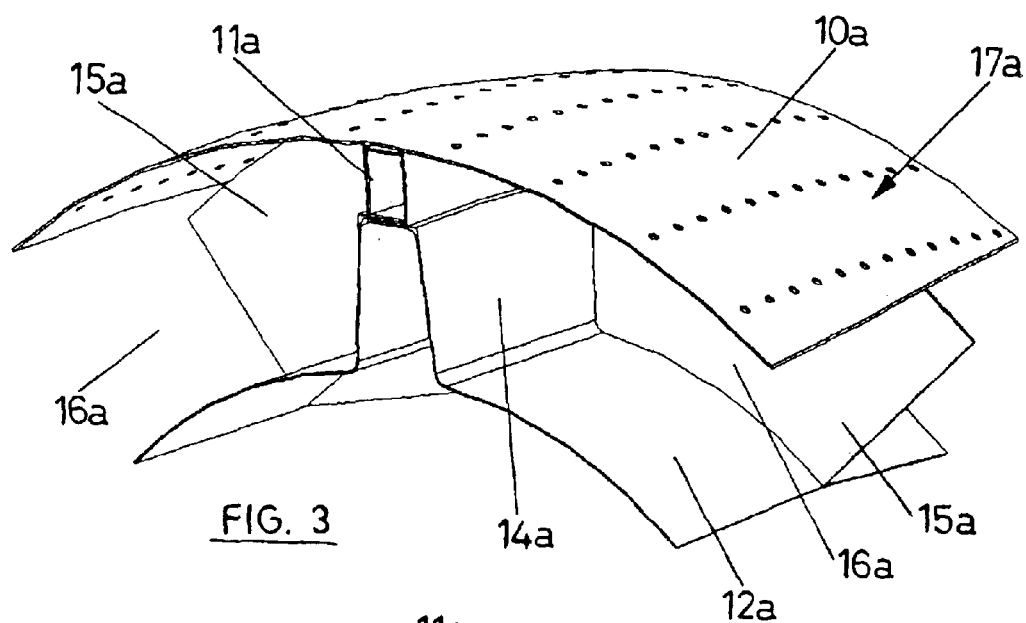
FIG. 3 is a detailed view of FIG. 1 in which is shown a possible materialization of the joint between the wet and dry walls.

Just as is observed in FIGS. 1 and 3, a plurality of partitions in form of circular sectors $15a$ are also distributed in axial direction in order to compartmentalize each sector $13a$, limited among the outer wall $10a$, the inner one $12a$ and the partitions $14a$, in cavities $16a$.

The joint between these partitions $15a$ and the inner wall $12a$ will be a mechanical joint, preferably welding when both elements are manufactured of the same material. Other joining methods, such as screwed joint, rivets, etc. will be valid too.

Figure 4:
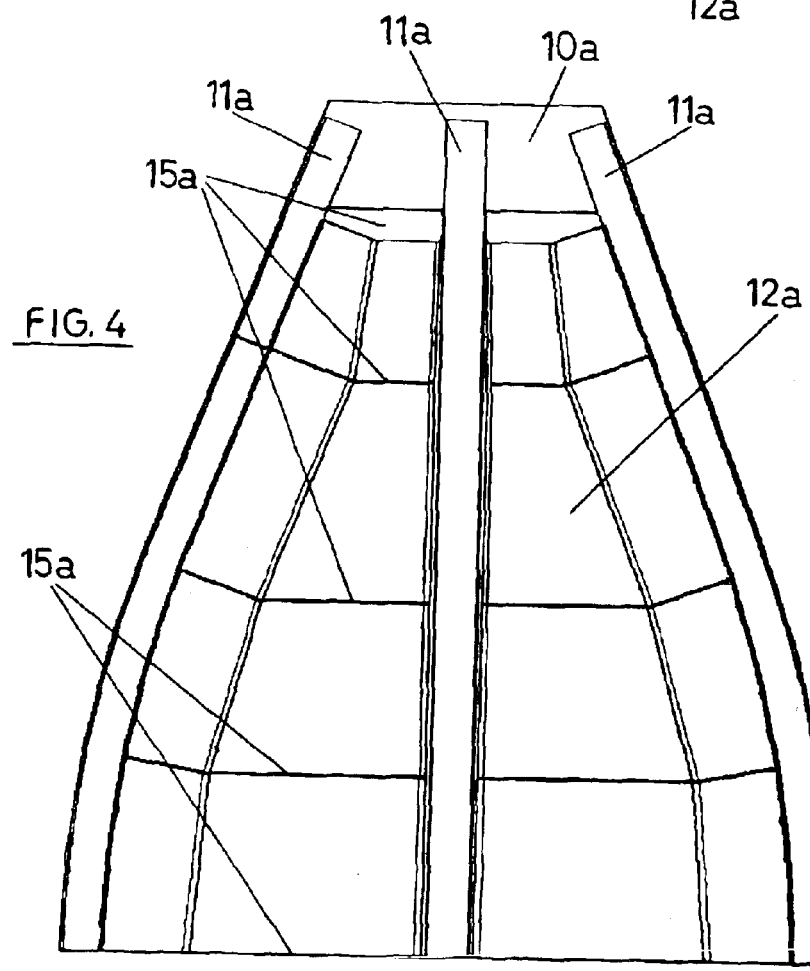
FIG. 4 is a cross-section of the noise reduction conduit by a plane which contains the engine axis.

In the case of the materialization presented in the FIG. 1, the inner wall has no aerodynamic requirements since the gas flow that passes through the engine does not circulate inside this duct in this specific materialization, so the inner wall profile can be polygonized in axial direction such as shown in FIG. 4, in order to make the manufacturing process of the sectors that compose the inner wall easier.

As it can be appreciated in the FIGS. 2 and 3, the longitudinal partitions 14a can form a single piece with the inner skin 12a of each sector 13a. This could happen in two or more sectors or in all them.

Figure 7:
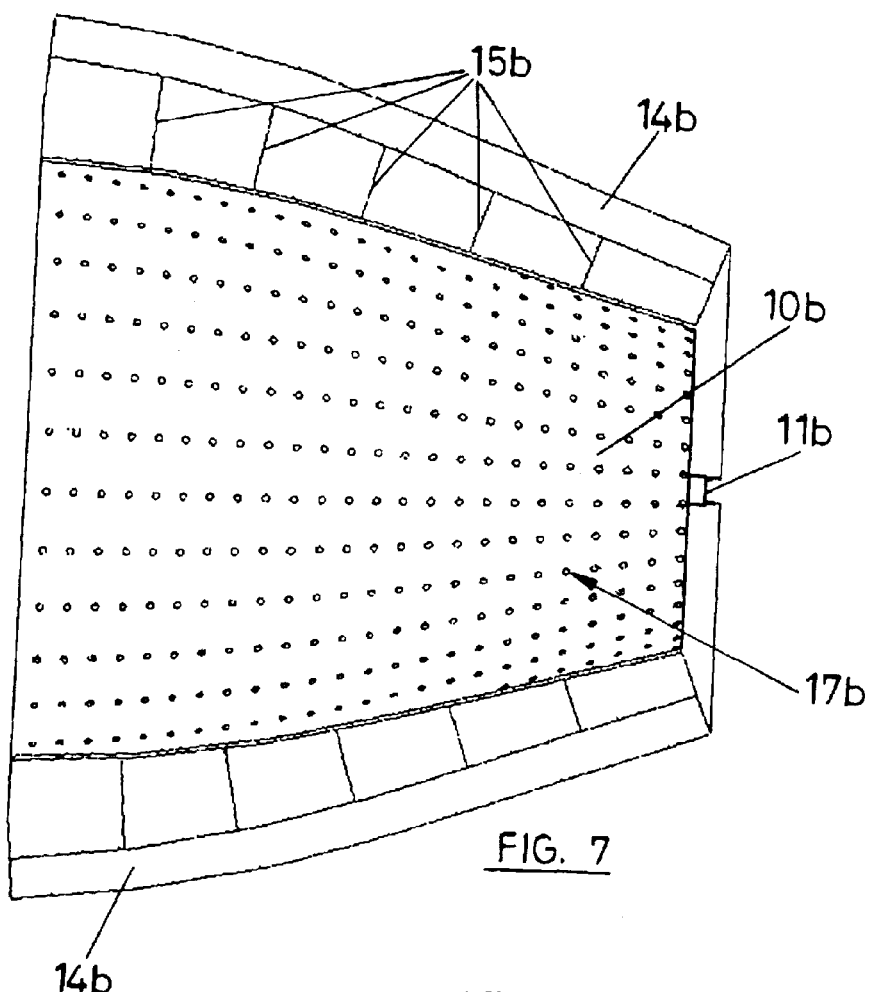
FIG. 7 is a cross-section of the noise reduction conduit, by a plane which contains the engine axis, in the case that the wet wall is the inner wall.

FIGS. 5 to 7 show a second materialization of the invention. In this case the aerodynamically wet wall is the inner wall, which is formed by a continuous skin 10b that follows an aerodynamic profile defined by the aerodynamic requirements imposed by the engine.

This inner wall 10b is perforated, with a density and size of holes 17b defined according to the acoustic requirements of the application.

The inner wall is completed with a series of intermediate resistant elements or stiffeners 11b (in this materialization four stiffeners have been disposed too, as an example) that are disposed in axial direction.

The inner wall 10b will be fixed to the stiffeners 11b through a mechanical joint using screws and nuts or rivets. Other joining methods can be used too, such as welding, brazing or bonding in case the temperatures of the gas that passes through the engine allow it.

The outer wall, or dry wall, 12b presents a similar constitution to the inner wall 12a of FIGS. 1 to 3, that is to say, it is circumferentially divided in four skins, constituting between the outer skin and the inner one 10b four sectors 13b, limited longitudinally by partitions 14b connected to the inner wall through stiffeners 11b by means of a mechanical joint. In turn each sector 13b is subdivided longitudinally in cavities by partitions 15b in form of circular sectors.

The attachment between these partitions 15b and the outer wall 12b will be a mechanical joint, preferably welding when both elements are manufactured with the same material. Other joining methods, such as screwed joint, rivets, etc. will be valid too.

In the case of the materialization presented in FIG. 5, the outer wall has no aerodynamic requirements, since the gas flow that passes through the engine does not circulate outside this duct in this specific materialization, so the outer wall profile can be polygonized in axial direction making the manufacturing process of the sectors that compose the outer wall easier.

Although the present invention has been exposed and explained with regard to the materializations shown in the figures, it should be understood by those specialists in the subject that diverse changes in the shape and details of such materialization could be carried out without modifying the spirit and scope of the invention herein claimed.

Figure 8:
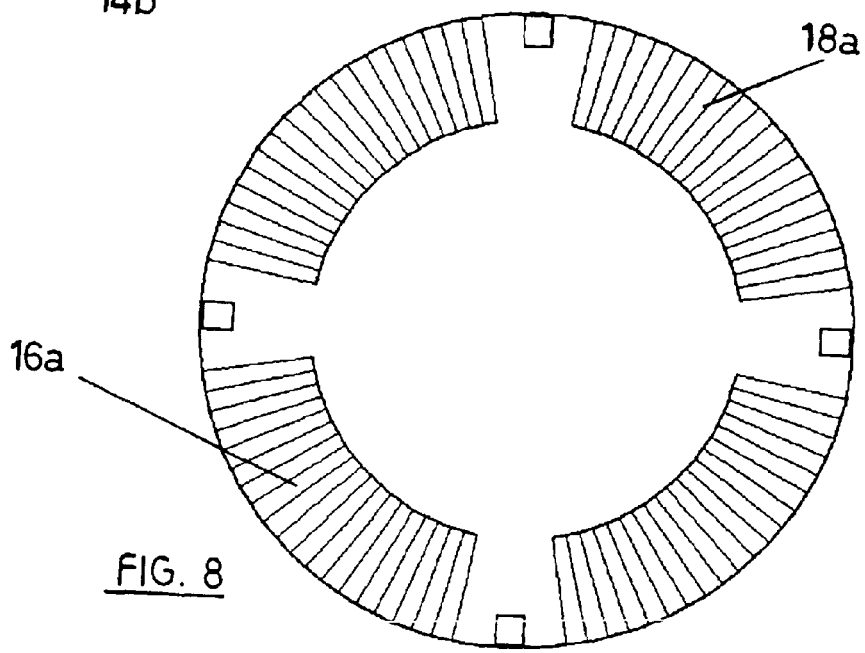
FIG. 8 is a cross-section perpendicular to the engine axis, of the noise reduction conduit showing a variant of execution.

In the materialization of the FIG. 8, the wet and dry walls are joined to each other through a honeycomb structure 18a which fills the cavities 16a and acts as intermediate element between both walls.

What is claimed is:

1. Noise reduction conduit for non rotary components of aircraft engines, subjected to a characteristic range of temperatures of a gas turbine engine, having an annular structure comprising:
    a perforated aerodynamic wet wall mechanically and thermally resistant;
    a light weight non-resistant dry wall spaced from the wet wall; and
    a plurality of intermediate elements mechanically attached to the wet wall and to the dry wall so as to define a jump or difference of temperature between the wet wall and the dry wall;
    wherein the wet wall, the dry wall and the intermediate elements are oriented to define a plurality of cavities isolated with regard to each other.

2. Conduit according to claim 1, wherein it has a revolution configuration.

3. Conduit according to claim 1, wherein the intermediate elements are oriented to define a plurality of cavities in both a circumferential direction and an axial direction between the dry wall and the wet wall.

4. Conduit as claimed in claim 3, wherein the intermediate elements joining the dry wall and the wet wall are oriented to define a honeycomb structure, directly defining cavities isolated with regard to each to other.

5. Conduit as claimed in claim 3, wherein there are intermediate elements respectively extending both in a circumferential direction and in an axial direction along the conduit.

6. Conduit according to claim 1, wherein the cavities are filled with an element selected from the group consisting of a filling structure, a material with acoustic damping characteristics and combinations thereof.

7. Conduit according to claim 6, wherein the intermediate elements joining the dry wall and the wet wall comprise a filling structure that fills the cavities.

8. Conduit according to claim 1, wherein the cavities are filled with an element selected from the group consisting of a filling structure, a material that provides acoustic absorption characteristics to the annular structure and combinations thereof.

9. Conduit according to claim 8, wherein the intermediate elements joining the dry wall and the wet wall comprise a filling structure that fills the cavities.

10. Conduit according to claim 1, wherein the intermediate elements joining the dry wall and the wet wall comprise an element selected from the group consisting of resistant elements, axial stiffeners and combinations thereof.

11. Conduit according to claim 1, wherein the intermediate elements joining the dry wall and the wet wall comprise a filling structure that fills the cavities.

12. Conduit according to claim 1, wherein the annular structure is hybrid, the wet wall and the dry wall being comprised of respective different materials.

13. Conduit according to claim 1, wherein the wet wall is provided with structural reinforcement ribs.

14. Conduit according to claim 1, wherein it is comprised of independent components connected to each other by removable joining elements.

15. Conduit according to claim 1, wherein the intermediate elements joining the dry wall and the wet wall are oriented to define a honeycomb structure, directly defining cavities isolate with regard to each to other.

16. Conduit as claimed in claim 1, wherein the intermediate elements are not perforated.

17. Conduit as claimed in claim 1, wherein the wet wall is comprised of a plurality of circumferentially separate sections, wherein each section is supported to the dry wall by at least one of the intermediate members.

* * * * *